US005186950A

United States Patent [19]

Mauro et al.

[11] Patent Number: 5,186,950

[45] Date of Patent: Feb. 16, 1993

[54] CURING DEVICE

[75] Inventors: Roberto Mauro; Karl J. Siegenthaler, both of Rome, Italy

[73] Assignee: Bridgestone/Firestone, Inc., Akron, Ohio

[21] Appl. No.: 725,712

[22] Filed: Jul. 3, 1991

[30] Foreign Application Priority Data

Jul. 17, 1990 [IT] Italy .............................. 67556 A/90

[51] Int. Cl.$^5$ .............................................. B29C 35/02

[52] U.S. Cl. ..................................... 425/28.1; 425/40; 425/41; 425/44; 425/50; 425/DIG. 13

[58] Field of Search ....................... 425/40, 41, 42, 50, 425/182, DIG. 13, 28.1, 44

[56] References Cited

U.S. PATENT DOCUMENTS

| | | | |
|---|---|---|---|
| 1,101,732 | 6/1914 | Doughty | 425/50 |
| 1,605,684 | 11/1926 | Meyer et al. | 425/41 |
| 1,777,486 | 10/1930 | Glidden | 425/41 |
| 2,455,637 | 12/1948 | Wright et al. | 425/40 |
| 2,797,441 | 7/1957 | Bauermeister et al. | 425/41 |
| 2,970,346 | 2/1961 | Fannen | 425/41 |
| 3,088,171 | 5/1963 | Macmillan | 425/41 |
| 3,240,653 | 3/1966 | Mattux et al. | 425/41 |
| 3,553,779 | 1/1971 | Miller | 425/41 |
| 3,823,293 | 7/1974 | Gilliatt | 425/41 |
| 4,190,405 | 2/1980 | Macmillan | 425/41 |
| 4,386,900 | 6/1983 | Sultan | 425/DIG. 13 |
| 4,728,274 | 3/1988 | Siegenthaler et al. | 425/41 |
| 4,747,765 | 5/1988 | Siegenthaler et al. | 425/42 |
| 4,861,253 | 8/1989 | Mattson | 425/50 |

*Primary Examiner*—Willard Hoag

*Attorney, Agent, or Firm*—Ernst H. Ruf

[57] ABSTRACT

A tire curing device in which a mold defines a toroidal chamber for accommodating a tire to be cured, and constituting a portion of a closed circuit along which a batch charge of a heat exchange fluid is force circulated, the fluid being heated by a heating unit provided with extractable internal axial electrical resistors, and lapped externally by the fluid from the toroidal chamber with the heating unit being mounted axially through an upper portion of a first tubular body, and axially engaging a second tubular body coaxial with the first tubular body; the tubular bodies defining there between a delivery conduit for the fluid to the toroidal chamber being defined between the second tubular body and the heating unit, the reistors of which are accessible externally through the upper portion of the first tubular body.

8 Claims, 2 Drawing Sheets

18
9
1
10
7
3
11
22
8
2
21
15
20
14
19
17
24
16
23
4
80
6
81
28
82
13
12
25
29
29
27
30
31
26

CURING DEVICE

TECHNICAL FIELD

The present invention relates to a tire curing device.

BACKGROUND OF THE ART

In particular, the present invention relates to a tire curing device of the type comprising a mold defining a toroidal chamber for accommodating a tire to be cured; a closed circuit for a batch charge of a heat exchange fluid, said chamber forming part of the closed circuit; powered circulating means assigned to the closed circuit for force circulating the heat exchange fluid along same; and heating means assigned to the closed circuit for heating the heat exchange fluid to a predetermined temperature. A prior art curing device of the above type is described in detail in U.S. Pat. No. 4,747,765, the content of which is fully incorporated herein by reference.

In the curing device described in the noted patent, a central curing unit is mounted through the mold; houses both the forced circulating and heating means; and is so designed as to define both a delivery and return conduit for the heat exchange fluid to and from the toroidal chamber.

This prior art curing device presents a number of functional drawbacks, mainly due to the design of the heating means and the return conduit to which the heating means are assigned. In the noted prior art curing device, the heating means consist of a heating element comprising a block of sintered material fitted inside the central unit, coaxial with the mold, and constituting, for the return conduit, a plug fitted through with a number of parallel, substantially axial channels along which the heat exchange fluid flows to the inlet of the circulating means.

Each channel houses an incandescent electrical resistor lapped directly by the heat exchange fluid, which is thus heated to the temperature required for curing a green tire housed inside the toroidal chamber. The swirl induced by the known heating element in the heat exchange fluid and immediately upstream from the circulating means is such as to seriously impair the efficiency of the circulating means and, therefore, the speed at which the heat exchange fluid enters the toroidal chamber.

Moreover, the known heating element is extremely delicate from the functional standpoint. Even the slightest interruption, caused by any external phenomena, in the flow of heat exchange fluid along the channels, invariably results in immediate melting of at least part of the electrical resistors inside the channels, so that the entire heating element must be replaced. This involves dismantling and opening up the central unit, thus resulting in considerable downtime.

SUMMARY OF THE INVENTION

The aim of the present invention is to provide an improved curing device of the aforementioned type designed to overcome the aforementioned drawbacks. With this aim in view, according to the present invention, there is provided a tire curing device comprising a mold defining a toroidal chamber for accommodating a tire to be cured; a closed circuit for a batch charge of a heat exchange fluid, said chamber forming part of said closed circuit; powered circulating means assigned to said closed circuit for force circulating said heat exchange fluid along the same; and heating means assigned to said closed circuit for heating said heat exchange fluid to a predetermined temperature; characterized by the fact that it also comprises a first and second tubular body arranged coaxially, the second inside the first, and defining a delivery conduit for said heat exchange fluid to said toroidal chamber; said first tubular body presenting an end portion extending axially beyond said second tubular body; said heating means comprising a heating unit having internal axial electrical resistors, and mounted axially through said end portion and said second tubular body; and a return conduit from said toroidal chamber being defined between said second tubular body and said heating unit, the resistors of which are accessible through said end portion of said first tubular body.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
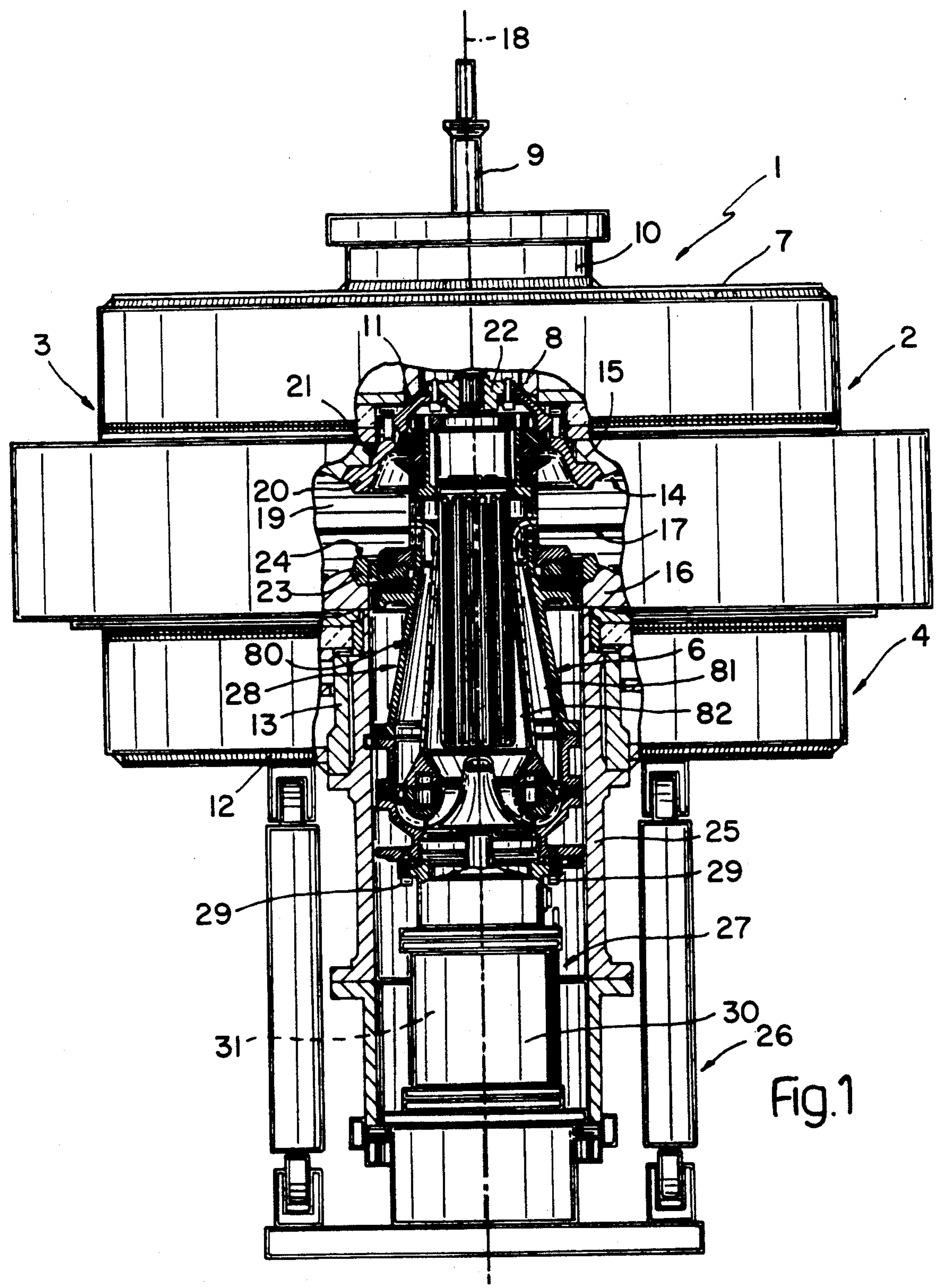
FIG. 1 shows an axial section of a preferred embodiment of the curing device according to the present invention.

Number 1 in FIG. 1 indicates a curing device constituting an improvement over that described and illustrated in U.S. Pat. No. 4,747,765, the content of which is fully incorporated herein by reference. Curing device 1 comprises a substantially cylindrical casing 2 defined by an upper half casing 3 and a lower half casing 4 connected in a releasable manner by a bayonet connector 5, and fitted through with a coaxial vertical central unit 6 as shown in detail in FIG. 2. Upper half casing 3 is substantially cup-shaped, and comprises a flat top wall 7 fitted through with a cylindrical tubular body 8 engaged by a shaft 9, the upper portion of which protrudes from half casing 3 through an externally flanged tubular body 10 enabling connection of half casing 3 to a known lifting device (not shown).

At the top, shaft 9 is connectable in known manner to a known actuating device for axially displacing shaft 9, and constitutes the upper element of an extracting device 11 to be described in more detail later. Lower half casing 4 is also substantially cup-shaped, and comprises a bottom wall 12 fitted through with a tubular body 13.

Casing 2 houses a toroidal curing mold 14 defined by an annular upper half mold 15 and an annular lower half mold 16 contacting each other along a surface 17 perpendicular to axis 18 of casing 2. Half molds 15 and 16 define a toroidal chamber 19 for accommodating a tire to be cured (not shown). Surface 17 divides chamber 19 into two parts, and is located below the horizontal plane of symmetry so that the portion of chamber 19 defined by upper half mold 15 is slightly larger than that defined by lower half mold 16.

The inner periphery of upper half mold 15 is engaged by an outer ring 20 on extracting device 11, which substantially consists of an upward-tapered bell 21 fitted on the bottom end with ring 20 and closed at the top by a disk 22 connected in a releasable manner to the bottom end of shaft 9. Bell 21 is so shaped that, when shaft 9 is pushed down in relation to upper half mold 15, the whole of bell 21 moves down, and ring 20 provides, during curing, support for the upper bead portion (not shown) of the tire (not shown) being cured. Similarly, the upper inner periphery of lower half mold 16 presents a fixed ring 23 which, together with ring 20, defines an inner annular opening 24 for access to chamber 19, and provides support for the lower bead portion (not shown) of the tire (not shown) being cured.

Tubular body 13 is fitted integrally with a tubular body 25 housing in sliding manner the intermediate portion of central unit 6, the upper portion of which extends through mold 14, and the lower portion of which is connected to an actuating device 26 for axially displacing unit 6 in relation to mold 14 between a raised operating position (as shown in FIG. 1) and an extracted position. As shown in FIG. 1, central unit 6 is elongated in shape, extends coaxially with casing 2, and comprises a lower portion 27 and an upper portion 28 connected together by means of a number of screws 29.

Figure 2:
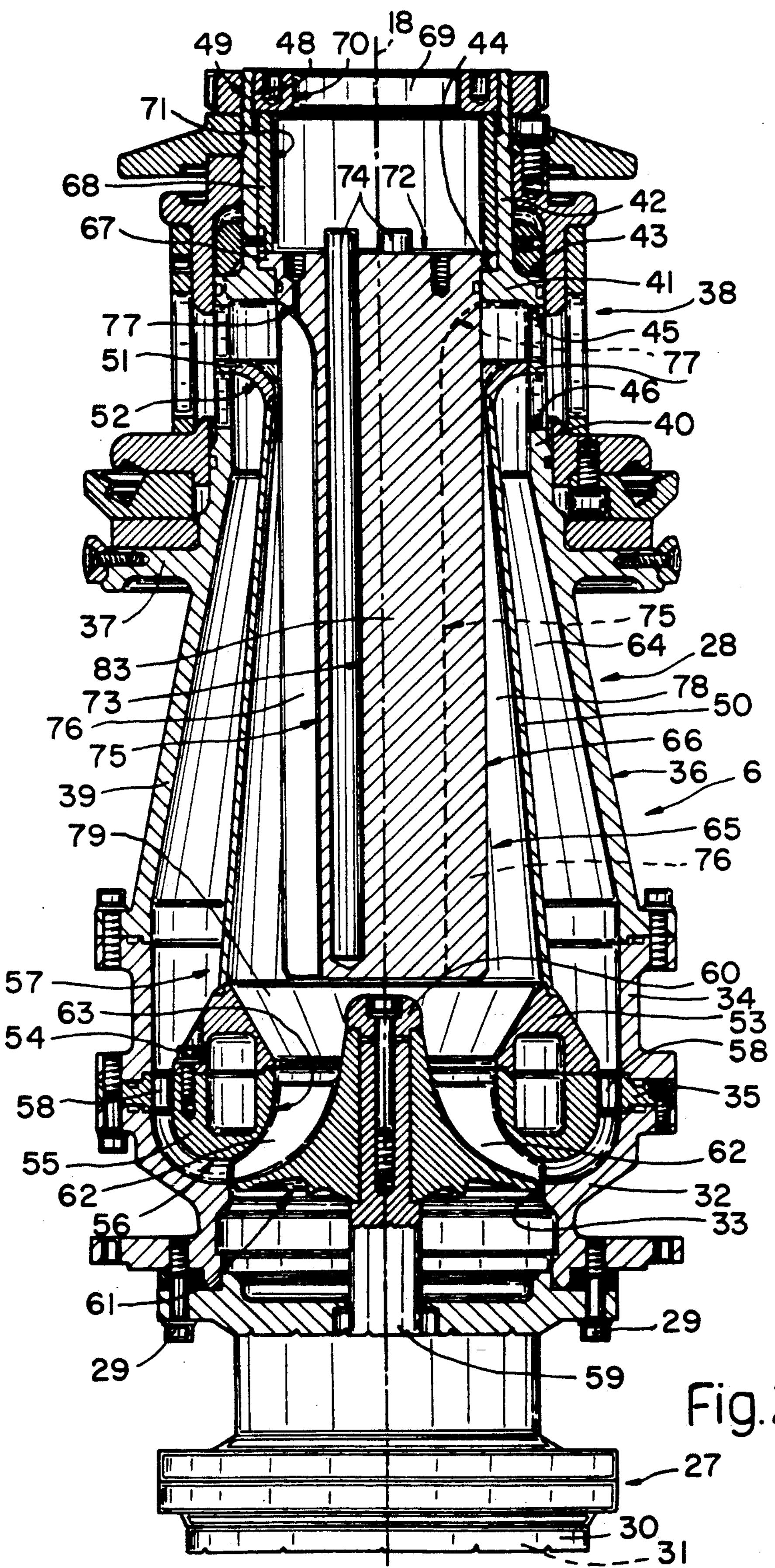
FIG. 2 shows a larger-scale view of a detail in FIG. 1.

As shown in FIG. 2, lower portion 27 comprises the tubular casing 30 of an electric motor 31; while upper portion 28 comprises a hollow lower body 32 having an axial through hole 33, and an intermediate tubular body 34 connected integrally with hollow lower body 32 via the interposition of a ring 35. Portion 28 also comprises an upper tubular body 36 connected to the top end of intermediate body 34, and an outer intermediate flange 37 which supports an adjustable coupling device 38 for a substantially C-section bladder (not shown) designed, in use, to occupy the internal volume of a tire housed inside chamber 19.

Upper tubular body 36 comprises a lower truncated-cone tubular portion 39; an intermediate cylindrical tubular portion 40 located over flange 37 and having, on its top end, an inner annular flange 41; and an upper cylindrical tubular portion 42 coaxial and integral with portions 39 and 40, and extending upwards from an intermediate portion of flange 41 so as to define, on the upper surface of flange 41, an outer shoulder 43 and an inner shoulder 44. Through intermediate portion 40, there are formed two superimposed rings of openings 45 and 46, the former located over the latter, and both combining to define a continuous ring 47. An internal thread 48 and external thread 49 are formed on the top end portion of upper portion 42.

Tubular body 36 has fitted on the inside thereof a coaxial truncated-cone tubular body 50 having its wider end facing downward. The taper ratio of tubular body 50 is less than that of lower tubular portion 39 of tubular body 36, and the narrower top end is fitted with a curved external flange 51, a peripheral annular surface of which contacts the inner surface of ring 47, and the lower surface 52 of which presents a section substantially in the form of an arc of a circle, and blends with the narrower end of tubular body 50.

The wider end of tubular body 50 is fitted with a ring 53 having an axial half-section substantially in the form of an isosceles triangle with its base facing downward. The base of ring 53 is secured, by screws 54, contacting the upper flat annular surface of a ring 55 housed inside lower body 32 and defined laterally and at the bottom by a surface 56 having a substantially U-shaped axial half-section.

Tubular body 50 and rings 53 and 55 integral therewith constitute a tubular assembly 57 coaxial with axis 18, located inside central unit upper portion 28, and supported by portion 28 via a number of arms 58 extending radially outwardly from surface 56 of ring 55 and integral with the inner periphery of ring 35.

Electric motor 31 presents, at the top, an output shaft 59 extending coaxially with axis 18 through rings 53 and 55, and is fitted, at the top end, with a head or cap 60 for axially locking an impeller 61 comprising a number of blades 62 and defining, together with rings 53 and 55 and the inner surface of hollow body 32, a curved annular channel 63 having a substantially U-shaped axial half-section. Channel 63 communicates externally with the bottom end of an annular-section conduit 64 defined between assembly 57 on one side and intermediate body 34 and lower portion 39 on the other, and communicating at the top with openings 46.

Portion 28 of unit 6 houses a substantially cylindrical heating unit 65 coaxial with axis 18 and having an outer surface 66 of substantially the same diameter as the inside diameter of flange 41 and the narrower end of tubular body 50. Unit 65 extends through flange 41 and tubular body 50 with its lower surface facing cap 60, and presents an upper annular flange 67 supported on inner shoulder 44 and locked contacting same by a tubular spacer 68 fitted in a sliding manner inside upper portion 42 and secured axially by an annular ring nut 69 mating with thread 48 and defining a central hole 70 enabling access to a cavity 71 defined laterally by the inner surface of spacer 68 and at the bottom by the flat upper surface 72 of unit 65. Through surface 72, there are formed a number of axial blind holes 73, each housing a straight shielded resistor 74 connected to an electric circuit (not shown) and removable manually through cavity 71 and hole 70 for maintenance and/or replacement.

Milled in surface 66 there are a number of axial grooves 75 defining radial heat exchange fins 76, and comprising a straight lower portion and a curved upper portion constituting one end of a curved channel 77 extending between the facing surfaces of flanges 41 and 51 and through a respective opening 45. The bottom ends of channels 77 all communicate with the top end of an annular conduit 78 defined between unit 65 and tubular body 50, and having a downwardly-increasing section. Along conduit 78, fins 76 constitute directional members for a stream of heat exchange fluid flowing along conduit 78.

The bottom end of conduit 78 communicates with the end of an annular channel 79 having a downwardly-decreasing section, surrounding head 60, and connected to channel 63, the top end of which is arranged directly facing the open bottom end of grooves 75.

As described and shown in FIGS. 1 and 2, in the operating position through mold 14, upper portion 28 of central unit 6 defines a circuit 80 for a heat exchange fluid; said circuit 80 comprising toroidal chamber 19, a delivery conduit 81 for supplying said fluid to chamber 19 and defined by channels 63 and 64 and openings 46, and a return and heating conduit 82 defined by openings 45, channel 77 and conduit 78. As described and shown in FIG. 1, return conduit 82 defines a Venturi tube, the narrow section portion of which corresponds with the point at which flange 51 is connected to the top end of tubular body 50, i.e. close to the point at which the heat exchange fluid contacts the central core 83 of heating unit 65.

A further point to note is that fins 76 extending along return conduit 82 act as directional flow equalizers for the heat exchange fluid supplied to impeller 61, i.e. for eliminating the swirl in the return stream by breaking it down into equal, substantially parallel threads or channels parallel to axis 18 of impeller 61. In actual use, the heat exchange fluid is supplied to chamber 19 along delivery conduit 81 and back to impeller 61 along return conduit 82, after first being heated in contact with heating unit 65.

At this point, mention should be made of the advantages afforded by the design of heating unit 65 in terms of working life and drastically reducing downtime for maintenance and/or replacement, and, more importantly, in terms of energy efficiency by the design of return conduit 82 which is largely defined by unit 65. With reference to heating unit 65 itself, by virtue of the fact that resistors 74 housed therein are of the shielded type, not directly lapped by the heat exchange fluid, the capacity of resistors 74 to safely withstand an interruption in the supply of heat exchange fluid is far superior to that of the incandescent types used in the prior art.

Moreover, replacement of a resistor 74 does not, as previously, necessarily involve replacing the entire heating unit 65, and may be performed relatively quickly through hole 70 and cavity 71 with device 1 in the open position. Replacement of the entire unit 65 may also be performed relatively quickly by lifting up half casing 3, unscrewing ring nut 69, removing spacer 68, changing unit 65 and thereafter replacing spacer 68 and ring nut 69. The ease with which the above operations are performed is mainly due to unit 65 being directly accessible through upper portion 42 of tubular body 36 constituting the top end of unit 6.

As for the improvement in the efficiency of device 1 afforded by the design of conduit 82, the concentricity of unit 65 and impeller 61 and the presence of axial fins 76 provide for optimizing the efficiency of impeller 61, which efficiency is inversely proportional to the angle of incidence of the input current in relation to the impeller axis, and to the amount of swirl present in the input current. As already, stated, fins 76 act as directional flow equalizers for the heat exchange fluid to impeller 61, that is, for eliminating the swirl present in the return flow by breaking it down into equal, substantially parallel channels parallel to the axis of impeller 61.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

We claim:

1. A tire curing device comprising a mold defining a toroidal chamber for accommodating a tire to be cured; a conduit loop for a batch charge of a heat exchange fluid, said chamber forming part of said conduit loop; powered circulating means useable with said conduit loop for force circulating said heat exchange fluid along same; and heating means useable with said conduit loop for heating said heat exchange fluid to a predetermined temperature; said device further comprising a first and second tubular body arranged coaxially, the second inside the first, and defining a delivery conduit for said heat exchange fluid to said toroidal chamber; said first tubular body presenting an end portion extending beyond said second tubular body; said heating means comprising a heating unit having internal axial electric resistors, and mounted axially through said end portion and said second tubular body; and a return conduit from said toroidal chamber being defined between said second tubular body and said heating unit, the resistors of which are accessible through said end portion of said first tubular body.

2. A device as claimed in claim 1 in which said heating unit presents an end surface located at said first tubular body end portion; and a number of axial blind holes formed through said end surface; each of said holes being engaged in sliding manner by a respective one of said resistors.

3. A device as claimed in claim 2 in which said heating unit is substantially cylindrical, and comprises a central core and a number of axial fins extending radially outwardly from same; said axial holes being formed through said central core.

4. A device as claimed in claim 3 in which the first tubular body end portion presents a substantially cylindrical tubular shape, and an inner annular shoulder; said heating unit extending through said shoulder and presenting supporting means cooperating with same; releasable fastening means being provided on said first tubular body end portion for locking said supporting means against said shoulder.

5. A device as claimed in claim 4 in which said fastening means are annular, said end surface being accessible through said fastening means.

6. A device as claimed in claim 4 in which each pair of adjacent fins defines a groove extending axially along said return conduit; each groove being open at a first end facing said powered circulating means, and comprising a substantially straight portion extending from said first end, and a curved portion; said curved portion defining, at a second end of each respective groove, a curved channel communicating with said toroidal chamber.

7. A device as claimed in claim 6 in which said return conduit presents an annular section, and defines a Venturi tube, a narrow section portion of which is located at a junction of said straight and curved portions of said grooves.

8. A device as claimed in claim 7 in which each resistor is a straight shielded resistor.

* * * * *